(12) United States Patent
Wurster

(10) Patent No.: US 10,650,152 B2
(45) Date of Patent: May 12, 2020

(54) DATA ACCESS CONTROL BASED ON STORAGE VALIDATION

(71) Applicant: BlackBerry Limited, Waterloo (CA)

(72) Inventor: Glenn Daniel Wurster, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 283 days.

(21) Appl. No.: 15/178,315

(22) Filed: Jun. 9, 2016

(65) Prior Publication Data

US 2017/0359341 A1 Dec. 14, 2017

(51) Int. Cl.
G06F 17/00 (2019.01)
H04L 29/06 (2006.01)
G06F 21/62 (2013.01)
G06F 21/60 (2013.01)
H04W 12/06 (2009.01)

(52) U.S. Cl.
CPC ...... G06F 21/6209 (2013.01); H04L 63/0876 (2013.01); *G06F 21/602* (2013.01); *H04L 63/123* (2013.01); *H04W 12/06* (2013.01)

(58) Field of Classification Search
USPC .......................................................... 726/1
See application file for complete search history.

(56) References Cited

U.S. PATENT DOCUMENTS

| 8,161,012 | B1* | 4/2012 | Gerraty ................... G06F 21/53 707/687 |
| 2005/0028006 | A1* | 2/2005 | Leser ........................ H04L 9/08 726/26 |
| 2008/0184329 | A1* | 7/2008 | Cross ................... G06F 21/6218 726/1 |
| 2014/0041044 | A1* | 2/2014 | Hymel .................... G06F 21/10 726/27 |
| 2014/0046906 | A1* | 2/2014 | Patiejunas ............. G06F 21/606 707/661 |

OTHER PUBLICATIONS

Apple Support, "About System Integrity Protection", Captured on May 5, 2016 on Internet Archive WayBack Machine, https://web.archive.org/web/20160305091001/https:/support.apple.com/en-us/HT204899, pp. 1-2.
Schneider, F., "Chapter 8: Mandatory Access Control", draft chapter for an untitled textbook on cybersecurity, Mar. 31, 2014, https://www.cs.cornell.edu/fbs/fullist.html, pp. 1-47.

* cited by examiner

*Primary Examiner* — Wasika Nipa
*Assistant Examiner* — Samuel Ambaye
(74) *Attorney, Agent, or Firm* — Jeffrey N. Giunta; Fleit Intellectual Property Law

(57) ABSTRACT

A system and method to control access to data are disclosed. A request for a subject to perform an action on an object is received. A determination is made whether a policy for the subject limits the action to an object with integrity protection. The action is performed based on determining the object has integrity protection. The request is rejected based on determining the object does not have integrity protection.

20 Claims, 5 Drawing Sheets

DATA ACCESS CONTROL BASED ON STORAGE VALIDATION

FIELD OF THE DISCLOSURE

The present disclosure generally relates to controlling access to data on a processing system, and more particularly to restricting access based on an evaluation of integrity of the data.

BACKGROUND

Computing devices of various types, from large computers to portable computing devices, embedded controllers of all types, and devices of all sizes, often have processes such as application programs that perform important or sensitive operations. Such processes may utilize stored data or other objects to direct, control, or otherwise support their operation. The operation of these computing devices can be influenced by the contents of these stored data objects. Unintended or otherwise unauthorized modifications of the data stored in these data objects may adversely affect the operation of the device. In some computing devices, Mandatory Access Control (MAC) systems are implemented to restrict access to stored data, particularly by processes that perform important or sensitive operations.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
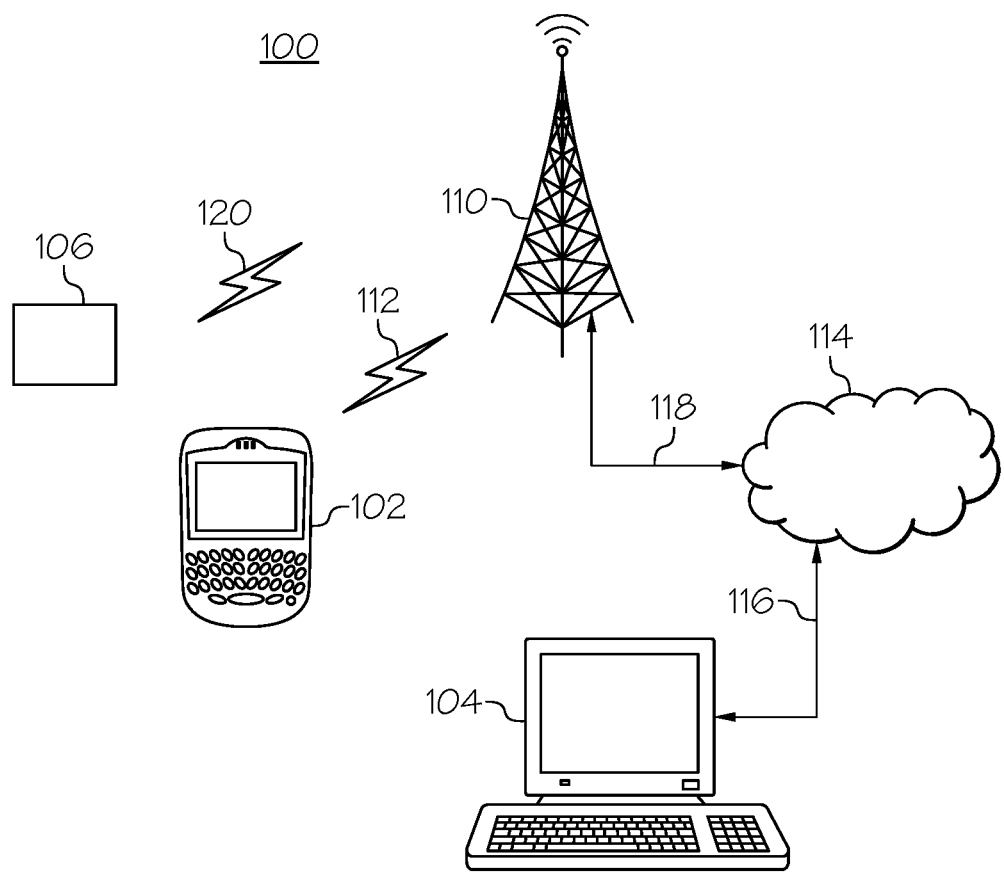
FIG. 1 illustrates a computing environment, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods relate to a mechanism for providing access control. The mechanism is able to enforce policy where access to a data object is in-part determined by successful verification of the integrity of the data object being accessed. In general, access control in some computing systems utilizes what is referred to as Mandatory Access Control (MAC) systems that attempt to restrict the privileges of a process to those privileges granted by the system integrator, system administrator, or other third party. In such MAC systems, the policies are specified by a system integrator in a manner that is not able to be overridden by the applications running on the system.

MAC systems generally depend on file meta-data in order to enforce protections. SELinux, which is one example of a MAC system, uses extended attributes of a file or directory on the file-system to store a label for each object. These labels can then be used with associated permission lines in the policy to specify what a particular process can do with files or directories labelled with a specific type.

In computing environments that are susceptible to modification of stored data, either inadvertently or intentionally such as due to error or hostile intent, any file that is not stored on an integrity protected file-system can be improperly modified. While encryption provides some protection against unauthorized intentional modifications, this is not always the best solution.

Some computer systems are able to ensure the data integrity of data storage elements, such as a file system on a block storage device, to determine if there have been any unauthorized modifications to the stored data. Examples of unauthorized modifications of data include: 1) modifying access control labels on a file to give a process additional privileges; 2) modifying labels in order to attempt to force a trusted application to execute using untrusted or harmful data that is unauthorized for processing with elevated privileges or capabilities; 3) modifying file data which was assumed to always reside in an integrity protected file, but for which integrity protection is incorrectly missing in the deployed configuration; 4) some other modification; or combinations of these. In some examples, applications or data associated with execution at elevated privileges are stored in data storage elements that provide integrity protection for stored data. Data integrity protection provided by some computer systems prevents changes to the file-system from going undetected. As long as no change is detected, such computer systems allow the privileged processes access to associated data contained on data storage that has data integrity protection.

Various techniques are able to be used to provide data integrity on data storage. These techniques generally include processing to ensure that data stored on the file system has not been altered by an unauthorized process. In an example, integrity protection is provided by maintaining hash values for previously stored data that are able to be compared to hash values for currently stored data. Integrity protection schemes generally provide a technique to indicate, or verify, that integrity protection is being provided for the file system. When a file system is first processed by a processor, an integrity layer is able to be set up for that file system by verifying that the integrity protection system is providing integrity protection for that file system.

Data integrity protection is able to be provided for many types of storage elements. For example, a block storage device is able to include one or more file systems that are each able to independently provide integrity protection. In some examples, one or more partitions or other data groups are able to be created on a data storage device, such as solid state memory, mechanical data storage devices, any data storage devices, or combinations of these. One or more file systems are then able to be established on a data storage partition. In the following description, the term file system is used to generally refer to any data storage group that stores data of any form, including but not limited to, data files, executable programs scripts, applications, or the like, access control labels for other data stored on the same or different file system, other data, or combinations of these. The term file system as used herein is not limited to any particular construct. For example, a file system may refer to one block device, one partition, or a single storage structure, although a file system may include multiple block devices, multiple partitions, multiple storage structures, or combinations of these, and multiple file systems are able to reside on one block device, one partition, or a single storage structure.

In other cases, data integrity protection is able to be provided on a per-file basis, such as may be supported by a specific file system driver. In an example, when a request to access the file is received by a processor, the integrity of the file is checked to make sure that unauthorized changes have not occurred before access is granted. In one example, the permissions and data of the file are integrity protected. For those systems that use a MAC policy based on labels, the labels are also integrity protected in some examples. In some examples, some file systems are able to support independent integrity protection of certain elements of an object, such as providing independent integrity protection of the object label, the object permissions, the contents of a file, other elements, or combinations of these. As is described in further detail below, policy specifications in examples that support independent integrity protections of such elements are able to specify which of those elements are to have integrity protection verified as a condition for performing an action.

Setting up integrity protection for a file system includes, in an example, verifying the integrity protection for the file system is in place. In an example, verification of the specified file system is performed by the operating system kernel of the device, which verifies that the file system is integrity protected. In an example, integrity protection of the file system is provided by using systems such as dm-verity or similar approaches. In some examples, file system integrity may be provided by the operation of the file system itself. In other examples, the file system driver may provide the ability for files with integrity protection to co-exist on the same file system with files that are not integrity protected. The integrity protection is able to be verified in an example by determining that the system performing the integrity protection is operating on the file and indicates that that the integrity of the file is being maintained.

In conventional MAC frameworks, there is no technique available to distinguish between a file labelled "example" on an integrity protected file system and a file that is also labelled "example" on a file system that is not integrity protected. The file on the file system which is not integrity protected can have its label or content changed, such as through an offline attack, potentially providing an attacker with access in the running system that they would not have otherwise had.

An example of such a scenario in a conventional MAC framework is a configuration file of a system service. In such an example, a system integrator may specify a policy that allows a particular system service, which might be running from a data storage partition that has integrity protection, to have permission to read from files labelled "config_file." In this case where the system is also able to access file-systems which are not integrity verified, an attacker has an ability to create files which are also labelled "config_file" that could potentially bypass the intended restrictions of the service. In such an example of a conventional MAC framework, policies cannot be based on the integrity of the underlying files and thus the policies cannot be properly enforced when untrusted labels may exist. In some conventional MAC systems, the labels of an untrusted file may prevent the attacker from modifying the contents of the file while the system is on-line. However, regardless of the protections afforded while the system is on-line, an off-line attack is still possible where an attacker is able to modify file contents regardless of the label and associated policy.

In summary, maintaining system integrity may be affected by an inability of a system integrator or other security manager to specify, using conventional MAC policies, when to trust objects with labels that are not integrity protected or to trust objects whose content is able to be modified outside of the policy, such as through an offline attack.

The below described systems and method allow specification of policies for performing actions on objects, such as accessing data within an object, based on verification of the integrity of the label of the object, the integrity of the contents of the object, or based on combinations of these. In an example, a system integrator or other security manager is able to take into account multiple specific attributes when creating policy:

1) Can I trust the label on this file/directory when writing the policy?

2) Can I trust the contents of this file/directory when writing the policy?

As an example, a system administrator may only want the boot script for the system to execute a binary labelled "io-pkt" from a trusted file-system as opposed to a binary labelled "io-pkt" from an untrusted file-system.

In an example, the below described systems and methods provide this ability by expanding object class type permissions. For example, in a SELinux environment, the object class type permissions are expanded to include the concept of integrity. This expansion is able to be achieved in any suitable manner Examples of expanding object class type permissions include the following three techniques.

A first manner to expand object class type permissions is to expand the object class for files and directories to include permissions for untrusted files in addition to permissions for trusted files. As an example, for the file object class, this may include permissions for the following:

1) permissions for both "read_signed" and "read_unsigned" instead of just "read."

2) permissions for "lock_signed" and "lock_unsigned" instead of just "lock."

In some examples, a file system that provides integrity protection for all data stored on that file system, actions that modify an object on that file system, such as writing or appending to the object, are restricted by the integrity protection. In an example that stores objects on integrity protected file systems, the above described additional permissions that separately specify permissions based on integrity protection are only added for operations that do not change the object since changing the object is already restricted. In an example, actions on objects that do not change the object, such as reading or locking the object, are referred to as actions for passive access to the object. In general, passive actions are actions that are not precluded by file system integrity protection schemes.

A second manner to expand the object class type permissions is to create a new object class for integrity protected files and directories that is distinct from the object class for files or directories that are untrusted. In an example, a file object for "example" with label "label" would have the object class type "file" if the file is untrusted, but the object class type "trusted_file" if the file is integrity protected A third manner to expand the object class type permissions is to modify the policy to indicate which object labels can be assigned to signed objects and which labels can be assigned to unsigned objects. In an example, an attempt to access an untrusted object that contains a label reserved for only trusted objects would result in an access violation. In an example, a MAC may assume that all labels are only to be associated with trusted objects except for certain specified labels. An example of a specification of a label (identified as <label>) that can be assigned to unsigned objects and therefore is not able to be trusted from an integrity standpoint is able to be in the form of:

untrusted <label>

In some examples with expanded object class permissions, access of a process to untrusted files is able to be restricted. These restrictions are able to be for files for which the integrity of their labels, contents, other metadata, or combinations of these, cannot be verified. In various examples, any method is able to be used to verify the integrity of the object or portion of the object. The below described systems and methods are able to verify the integrity of objects by, for example, file-based techniques such as cryptographic signatures, partition-based integrity protections, any other integrity verification technique, or combinations of these.

In further examples, some MAC systems specify policies based on a path to the data object. An example of such a MAC system is AppArmor. In such examples, a policy is able to be specified by indicating that a process or other subject is able to work with: 1) an integrity protected object, 2) an object that is not integrity protected; 3) objects that are integrity protected or not integrity protected; or 4) objects that are neither integrity protected nor not integrity protected. In such examples, the MAC system is modified to allow specifying additional permissions on the path.

In an example of a conventional AppArmor policy line, a policy that allows read-write access to the specified path is:

/data/some/file rw

In an expanded path-based policy system, a policy line in an example is able to specify only read access if the file is integrity protected, and no access if the file is untrusted. Such as specification may be in the form of:

/data/some/file i(r), u( )

In general, the below described systems and methods expand MAC policies to allow the system integrator to distinguish actions on objects differently based on whether the object has integrity protected labels, is an integrity protected file, has other integrity protection, or combinations of these. Such objects with a specified integrity protection are able to be distinguished in policy specifications from those that do not have integrity protection. In some examples, when a policy specifies that the object, or an element of the object, is to have integrity protection for a specified action, the status of the integrity protection of the object or specified element of the object is verified prior to performing the action.

FIG. 1 illustrates a computing environment 100, according to an example. The computing environment 100 depicts a plurality of electronic devices, including an electronic device 102, a computer 104, and a device with an embedded processor 106. In general, these electronic devices are used by individuals to perform various functions. These electronic devices are examples of devices that include data storage used to store applications, user data, system data, other data, or combinations of these. The illustrated electronic devices are only examples used to illustrate certain relevant aspects in this description and are not limiting. In general, a large variety of any type of suitable electronic device is able to incorporate data storage and one or more processors that use data stored in the data storage to perform important or sensitive operations within the device. Examples of electronic devices that can incorporate the concepts described herein include, but are not limited to, mobile devices, smartphones, tablet computers or other tablet devices, laptops, gaming devices, fitness devices, medical devices, other health related devices, smartwatches, wearable devices, cameras, televisions, any type of appliance, components within a vehicle, components within a car, any other type of device, or combinations of these. It is to be understood that the systems and methods described herein are applicable to any computing device that implements access controls on objects stored on the device or remotely. In various examples, the systems and methods described herein are able to be utilized on any processing device, including devices that have no external data communications, devices with limited external data communications, devices with external communications, any type of device, or combinations of these.

The depicted electronic devices are shown to be able to perform electronic communications with each other and with other devices (not shown) via a communications network 114. The portable electronic device 102 and device with an embedded processor 106 are in wireless communications with a wireless base station 110 via a first wireless link 112 and a second wireless link 120, respectively. A wireless base station 110 is depicted for ease of understanding and description, but is understood to represent one or more wireless communications systems. Examples of communications systems using a wireless base station 110 include long range wireless communications such as cellular communications systems, wide area wireless network systems, any other long range wireless communications system, or combinations of these. The wireless base station 110 is also able to include one or more shorter range wireless communications systems such as WiFi®, Bluetooth®, Near Field Communications (NFC), any other short range system, or combinations of these.

The wireless base station 110 and the computer 104 are connected to a communications network 114. Examples of the communications network 114 include, but are not limited to, the Internet, data communications networks connecting selected locations, any accessible network, any data communications network, or combinations of these. The computer 104 in the illustrated example is connected to the communications network 114 by a first link 116. The wireless base station 110 in the illustrated example is connected to the communications network by a second link 118. The use of a simple link in this illustration is for ease of understanding and explanation, but it is understood that electronic devices and wireless nodes, such as the computer 104, wireless base station 110, other devices, or combinations of these, are able to be connected to the communications network 114 by any suitable technique. Particular connections to the communications network is able to be via, for example, sub-networks that include one or more of wired connections or wireless connections.

Figure 2:
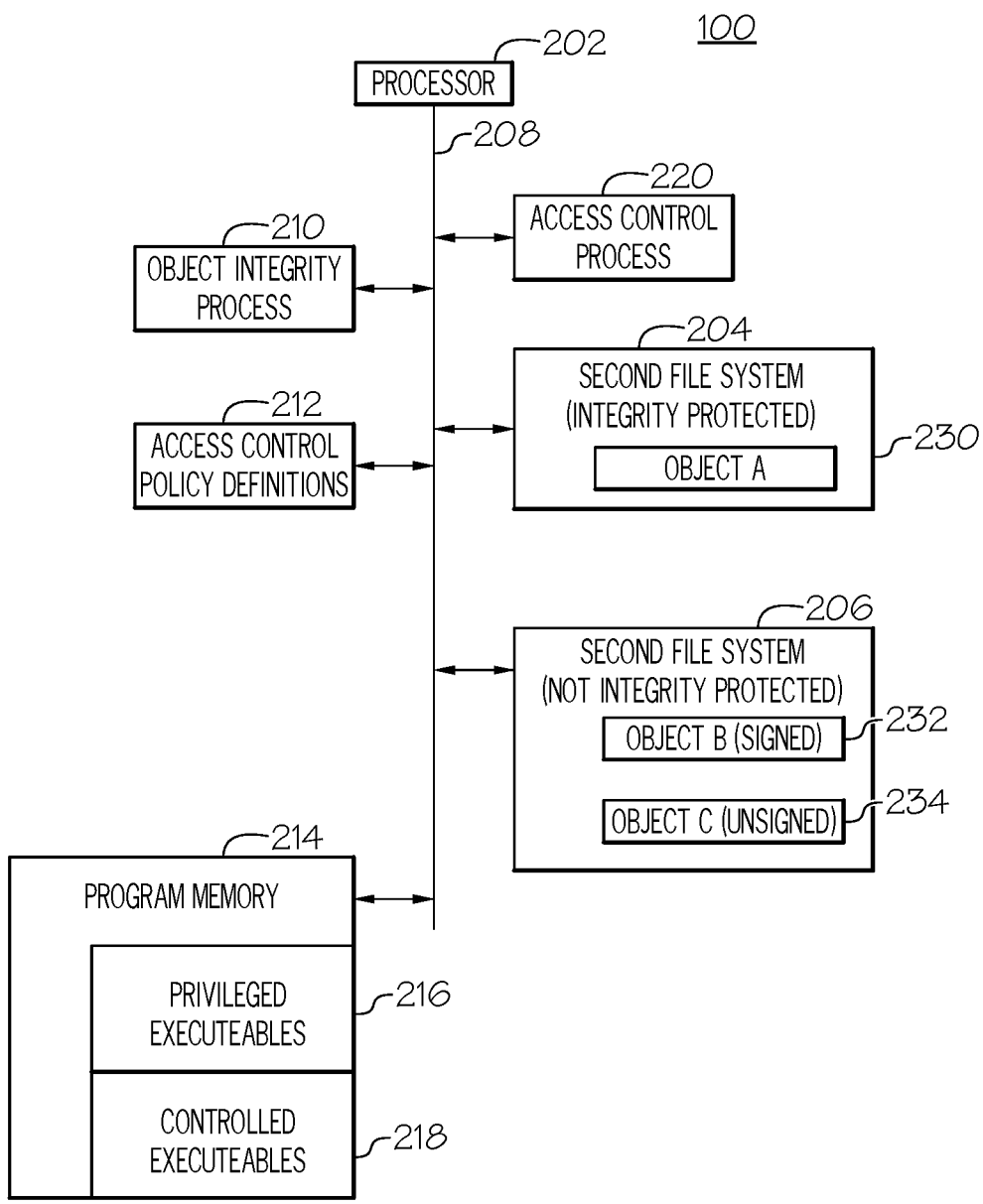
FIG. 2 illustrates an electronic device block diagram, according to an example.

FIG. 2 illustrates an electronic device block diagram 200, according to an example. The electronic device block diagram 200 is an example of some of the components within one or more of the devices described above with regards to computing environment 100, such as the portable electronic device 102, the computer 104, or the device with an embedded processor 106. The electronic device block diagram 200 includes a processor 202, a program memory 214, a first file system 204, a second file system 206, an object integrity process 210, an access control policy definitions 212, and an access control process 220. These components communicate with one another via a communications channel 208. The electronic device block diagram 200 is a simplified block diagram of any suitable electronic device that is able to execute applications, use data, perform other operations, or combinations of these.

Access control policy definitions 212 in an example stores the specification of security policies that define actions that one or more subjects, such as executable processes, are able to perform on one or more objects such as data files. As described above, these access control policy definitions 212 are able to specify policies based on whether the object is integrity protected, has its integrity verified, or combinations of these.

The access control process 220 in an example is a process that enforces the access control policies defined in the access control policy definitions 212. In an example, the access control process 220 is a Mandatory Access Control (MAC) system. In further examples, the access control process 220 is able to be a Discretionary Access Control (DAC) system. The access control process 220 in an example recognizes policies definitions that specify different allowable actions based on whether the integrity of an object is verified or is not able to be verified. In an example, the access control process 220 interacts with the object integrity process 210 and operates in a domain that is separate from other processes. For example, the access control process 220 is able to be included as part of a file system or operate as an intermediary between executing processes and the file systems.

An object integrity process 210 operates to verify the integrity of objects, or parts of objects, that are acted upon by processes or other subjects. The object integrity process 210 in an example is able to be stored as a privileged executable 216 or a controlled executable 218. In various examples, an object integrity process 210 is able to use one or more techniques to verify the integrity of an object. In some examples, the object integrity process 210 protects the integrity of an entire file system, such as is performed by dm-verity. In some examples, the object integrity process 210 verifies the integrity of one object or a subset of objects stored on a file system. For example, an object integrity process is able to verify a cryptographic signature of an object, part of an object, of a number of objects signed with one signature, of other data, or combinations of these. In general, the object integrity process 210 is able to implement any one or more techniques to perform integrity protection, integrity verification, or both, on all or on parts of one or more objects.

The program memory 214 includes privileged executables 216 and controlled executables 218. In general, the privileged executables 216 and controlled executables 218 define processes executed by the processor 202 that perform important or sensitive operations on the device. These processes access data that control their execution. In some examples, restrictions may be placed on these processes regarding the data objects these processes can access such as by policies defined in the access control policy definitions 212. For example, one or more of these processes may be restricted in access to certain data objects that affect their execution by only allowing access to those data objects if their integrity is verified. In general, a security manager is able to specify any restrictions for any executable process or other subject by specifying policies restricting the actions the subject is able to perform on particular objects.

In the illustrated example, the first file system 204 is a data storage that provides integrity protection. Such a file system is referred to herein as an integrity protected file system. In an example, integrity protection is provided in conjunction with the object integrity process 210. The first file system 204 includes an object A 230. The integrity of data objects stored in the first file system is protected by the operation of the protected file system. An example of such an integrity protected file system is a file system controlled by dm-verity. In an example, the integrity verified file system will allow access to data stored in the file system only if the integrity of the file system is verified. If the operating system component, such as the object integrity process 210, cannot verify the integrity of the first file system, the operating system will not allow access to any data on the file system.

The second file system 206 in this example does not provide data integrity protection and therefore objects stored on the second file system may be changed without detection. In an example, the second file system is used to store data by the operation of this electronic device, such as data accumulated by the device, downloaded application, any other data, or combinations of these.

The second file system 206 includes object B 232, which is cryptographically signed to provide integrity protection, and object C 234, which is not signed. Although the second file system does not provide integrity protection, the integrity of object B 232 is able to be verified based on verification of the signature of object B 232, such as by the object integrity process 210. Because object C 234 is not signed, its integrity cannot be verified.

Figure 3:
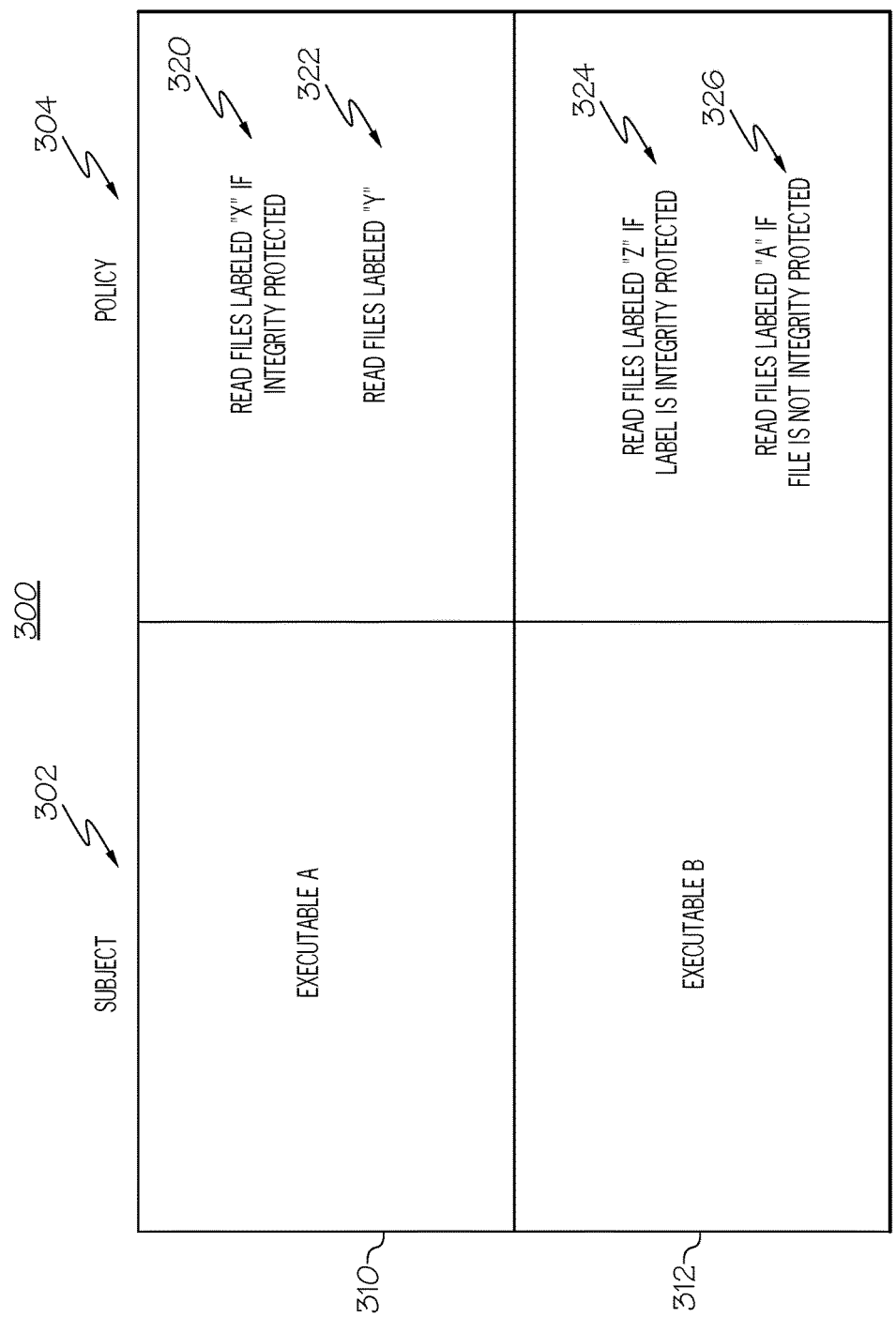
FIG. 3 illustrates an example policy definition, according to an example.

FIG. 3 illustrates an example policy definition 300, according to an example. The example policy definition 300 illustrates MAC policy definitions for two subjects, an executable A 310 and an executable B 312. The example policy definition 300 has a subject column 302, which identifies the subject, and a policy column 304, which defines the policies for each subject. In general, a policy definition for a subject is able to include policies for any number of objects and for objects of various types. Policy definitions are also able to specify for each subject any number of actions. In the illustrated example, the example policy definition 300 includes specifying actions based on whether the integrity protection of the subject is verified.

Executable A 310 has a first policy 320 specifying "read files labeled 'X' if integrity protected." Based on this policy definition, executable A 310 is able to read an object with label "X" only if that object is integrity protected. This is an example of a policy that limits requested actions to objects based on integrity verification of the object. As discussed above, integrity protection of the object with label "X" is able to be verified by any suitable technique. If executable A 310 attempts to read an object with label "X" and that object is not integrity protected, i.e., the integrity of that object cannot be verified, the policy will not allow that action.

Executable A 310 also has a second policy 322 specifying "read files labeled 'Y.'" The second policy 322 provides a general permission to read any object with label "Y." This policy does not specify whether the object requires integrity protection, so executable A 310 is able to access any object with label "Y" regardless of the integrity protection of the object, its contents, its label, or combinations of these.

Executable B 312 has a third policy 324 specifying "read files labeled 'Z' if label is integrity protected." Based on this policy definition, executable B 312 is able to read an object with label "Z" only if its label is integrity protected. As discussed above, integrity protection of one or more elements of an object, such as the object's label, is able to be independently provided and verified by any suitable technique. For example, an object stored with its label in an integrity protected partition has an integrity protected label as well as integrity protection for the object itself. In general, similar policy specifications are able to indicate that one or more particular elements of an object are to be integrity protected, or are not to be integrity protected, in order to allow a particular action by a particular subject.

In some examples, a label, with or without its object, may be stored on a file system that does not itself provide integrity protection. In one such case, the label and object may both have integrity protection such as by a cryptographic signature. The third policy 324 allows executable B 312 to read such objects because there is integrity protection for the label. This is an example of a policy that limits requested actions to object that have labels with integrity verification. In one example, it is possible to have a scenario where just the label has a cryptographic signature to verify its integrity, even though the object itself may not have integrity protection. In that example, the third policy 324 allows executable B 312 to read that object. If executable A 310 attempts to read an object with label "X" and that object is not integrity protected, i.e., the integrity of that object cannot be verified, the policy will not allow that action.

Executable B 312 also has a fourth policy 326 specifying "read files labeled 'A' if file is not integrity protected." Based on this policy definition, executable B 312 is able to read an object with label "Z" only if the object is not integrity protected.

The example policy definition 300 illustrates a set of policies for controlling actions by subjects on at least one object. The set of policies illustrated above include a policy to limit actions to objects with integrity protection, such as the first policy 320 and the third policy 324. The illustrated set of policies further includes a policy to limit actions to objects regardless of integrity verification of the object, such as the second policy 322.

Figure 4:
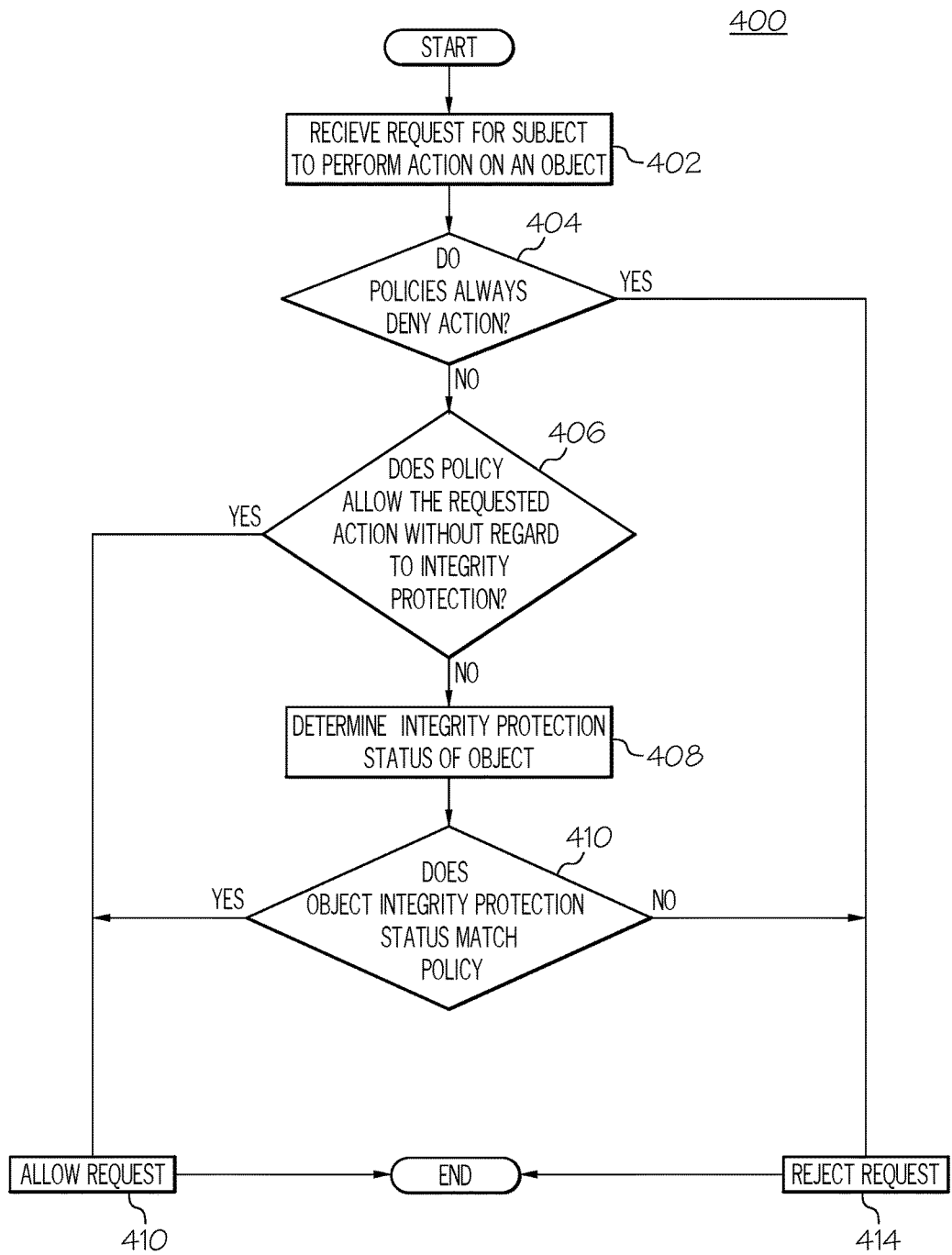
FIG. 4 illustrates an object access process, according to an example.

FIG. 4. Illustrates an object access process 400, according to one example. The object access process 400, in an example, illustrates a process performed by the access control process 220 executing on processor 202. The object access process 400 in an example is part of a MAC system policy enforcement process that restricts access to objects on a computing system according to defined policies.

The object access process 400 beings by receiving, at 402, a request for a subject to perform an action on an object. An example of such a request is a request by an executing process to read data within a data object that is stored on a file system.

The object access process 400 determines, at 404, if the policies always deny the requested action. An example of always denying a requested action would be a policy definition that explicitly denies the requested action on the object of the request under all conditions. Another example of always denying a requested action is a set of policy definitions that does not include any explicit permission to perform the requested action on the object of the request. If policies do always deny the requested action, the request is rejected, at 414, and the object access process 400 ends.

If it is determined, at 404, that the policies do not always deny the requested action on the object specified in the request, the object access process 400 determines, at 406, whether the policy definitions allow the action without regard to integrity protection of the object. An example of such a policy is the second policy 322 discussed above. If this determination is true, the object access process 400 allows the action, at 412, and then ends.

If the determination that the policy allows the action without regard to integrity protection of the object is false, the object access process 400 determines, at 408, the integrity protection status of the object of the request. This determination is an example of determining that a policy limits the requested action to an integrity verified object. In general, the integrity protection determined at this stage corresponds to the integrity protection specified in the policy for the subject to perform the requested action. For example, determining that the object is stored on an integrity protected partition confirms the integrity protection of the object. If an object has integrity protection provided by a digital signature, such as a cryptographic signature, the integrity protection is provided by verifying the signature or signatures of the object in order to determine that the object has a verified validation signature.

The object access process 400 determines, at 410, if the integrity protection of the object matches the integrity protection specified in the policy. In some examples, the policy specifies that the subject can only perform the requested action on objects that are integrity protected. In further examples, the policy is able to specify that the subject is only able to perform the requested action on objects that have verified integrity protection for particular elements such as the object's label, permissions, data contents, other elements, or combination of these. In yet further examples, the policy is able to specify that the subject is only able to perform the requested action on objects that are not integrity protected. In any of these examples, this determination determines if the integrity protection status determined for the object, at 408, matches the specification of the policy. For example, if the policy specifies that the action is permitted for objects whose data has integrity protection, this determining determines if the object has integrity protection of data within the object. If this determination is true, the requested action is allowed, at 412. If this determination is not true, the request is rejected, at 414. Rejection of the request based on this determination not being true is an example of a rejection of the request based on determining the object is not integrity verified. The object access process 400 then ends.

Figure 5:
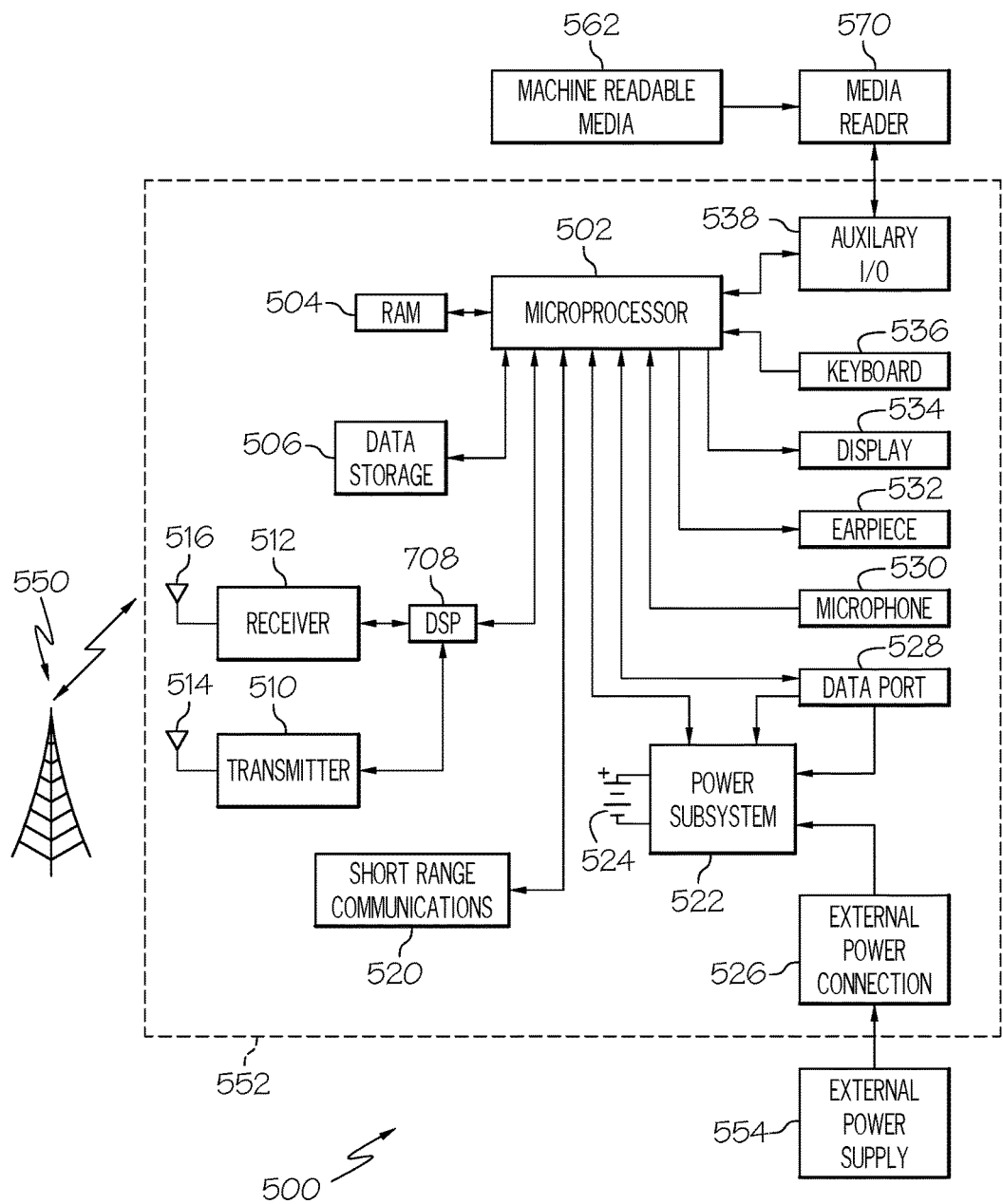
FIG. 5 is a block diagram of an electronic device and associated components in which the systems and methods disclosed herein may be implemented.

FIG. 5 is a block diagram of an electronic device and associated components 500 in which the systems and methods disclosed herein may be implemented. In various examples, the electronic device 552 is able to be an example of the above described portable electronic device 102, which is an example of a wireless two-way communication device with voice, text chat, and data communication capabilities. Such electronic devices communicate with a wireless voice, text chat, or data network 550 using a suitable wireless communications protocol. Wireless voice communications are performed using either an analog or digital wireless communication channel. Data communications allow the electronic device 552 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 552 is an example electronic device that includes two-way wireless communications functions. Such electronic devices incorporate communication subsystem elements such as a wireless transmitter 510, a wireless receiver 512, and associated components such as one or more antenna elements 514 and 516. A digital signal processor (DSP) 508 performs processing to extract data from received wireless signals and to generate signals to be transmitted. The particular design of the communication subsystem is dependent upon the communication network and associated wireless communications protocols with which the device is intended to operate.

The electronic device 552 includes a microprocessor 502 that controls the overall operation of the electronic device 552. The microprocessor 502 interacts with the above described communications subsystem elements and also interacts with other device subsystems. In various examples, the electronic device 552 is able to include one or more of various components such as a data storage 506, random access memory (RAM) 504, auxiliary input/output (I/O) device 538, data port 528, display 534, keyboard 536, earpiece 532, audio sound reproduction system 570, microphone 530, a short-range communications subsystem 520, a power subsystem 522, other subsystems, or combinations of these.

One or more power storage or supply elements, such as a battery 524, are connected to a power subsystem 522 to provide power to the circuits of the electronic device 552. The power subsystem 522 includes power distribution circuitry for providing power to the electronic device 552 and also contains battery charging circuitry to manage recharging the battery 524 (or circuitry to replenish power to another power storage element). The power subsystem 522 receives electrical power from external power supply 554. The power subsystem 522 is able to be connected to the external power supply 554 through a dedicated external power connector (not shown) or through power connections within the data port 528. The power subsystem 522 includes a battery monitoring circuit that is operable to provide a status of one or more battery status indicators, such as remaining capacity, temperature, voltage, electrical current consumption, and the like, to various components of the electronic device 552.

The data port 528 is able to support data communications between the electronic device 552 and other devices through various modes of data communications, such as high speed data transfers over an optical communications circuits. Data port 528 is able to support communications with, for example, an external computer or other device. In some examples, the data port 528 is able to include electrical power connections to provide externally provided electrical power to the electronic device 552, deliver electrical power from the electronic device 552 to other externally connected devices, or both. Data port 528 of, for example, an electronic accessory is able to provide power to an electronic circuit, such as microprocessor 502, and support exchanging data between the microprocessor 502 and a remote electronic device that is connected through the data port 528.

Data communication through data port 528 enables a user to set preferences through the external device or through a software application and extends the capabilities of the device by enabling information or software exchange through direct connections between the electronic device 552 and external data sources rather than via a wireless data communication network. In addition to data communication, the data port 528 provides power to the power subsystem 522 to charge the battery 524 or to supply power to the electronic circuits, such as microprocessor 502, of the electronic device 552.

Operating system software used by the microprocessor 502 is stored in data storage 506. Examples of data storage 506 are able to include, for example, flash memory, magnetic based storage devices, other volatile or non-volatile data store elements, or the like. Some examples are able to use data storage 506 that includes a battery backed-up RAM or other non-volatile storage data elements to store operating systems, other executable programs, or both. The operating system software, device application software, or parts thereof, are able to be temporarily loaded into volatile data storage such as RAM 504. Data received via wireless communication signals or through wired communications are also able to be stored to RAM 504. The microprocessor 502 in some examples includes a component, such as is able to be defined in data storage 506 in one example, that includes the processes described above.

The microprocessor 502, in addition to its operating system functions, is able to execute software applications on the electronic device 552. A set of applications that control basic device operations, including at least data and voice communication applications, is able to be installed on the electronic device 552 during manufacture. In an example, programs and other data used to support the processes described above are able to be installed in the memory of the electronic device 552. Further examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 552 through, for example, the wireless network 550, an auxiliary I/O device 538, Data port 528, short-range communications subsystem 520, or any combination of these interfaces. Such applications are then able to be installed by a user in the RAM 504 or a non-volatile store for execution by the microprocessor 502.

In a data communication mode, a received signal such as a text message or web page download is processed by the communication subsystem, including wireless receiver 512 and wireless transmitter 510, and communicated data is provided the microprocessor 502, which is able to further process the received data. In some examples, the electronic device 552 includes a display, output ports, or combinations of these. In such examples, the received data is able to be processed for output to the display 534, or alternatively, to an auxiliary I/O device 538 or the Data port 528. In examples of the electronic device 552 that include a keyboard 536 or other similar input facilities, a user of the electronic device 552 may also compose data items, such as e-mail messages, using the keyboard 536, which is able to include a complete alphanumeric keyboard or a telephone-type keypad, in conjunction with the display 534 and possibly an auxiliary I/O device 538. Such composed items are then able to be transmitted over a communication network through the communication subsystem.

For voice communications, overall operation of the electronic device 552 is substantially similar, except that received signals are generally provided to an earpiece 532 and signals for transmission are generally produced by a microphone 530. Alternative voice or audio I/O subsystems, such as a voice message recording subsystem, may also be implemented on the electronic device 552. Although voice or audio signal output is generally accomplished primarily through the earpiece 532, in examples of electronic devices 552 that include a display 534, the display 534 may also be used to provide an indication of the identity of a calling party, the duration of a voice call, or other voice call related information, for example.

Depending on conditions or statuses of the electronic device 552, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 520 provides for data communication between the electronic device 552 and different systems or devices, which need not necessarily be similar devices. For example, the short-range communications subsystem 520 includes an infrared device and associated circuits and components or a Radio Frequency based communication module such as one supporting Bluetooth® communications, to provide for communication with similarly-enabled systems and devices, including the data file transfer communications described above. The short-range communications subsystem is also able to include one or more of components to support communications over wireless links such as Wi-Fi®, Near Field Communications (NFC), any other short range link, or combinations of these In some examples, an optional media reader 570 is able to be connected to an auxiliary I/O device 538 to allow, for example, loading computer readable program code of a computer program product into the electronic device 552 for storage into data storage 506 that may include, for example, flash memory. One example of a media reader 560 is an optical drive such as a CD/DVD drive, which may be used to store data to and read data from a computer readable medium or storage product such as computer readable storage media 562. Examples of suitable computer readable storage media include optical storage media such as a CD or DVD, magnetic media, or any other suitable data storage device. Media reader 560 is alternatively able to be connected to the electronic device through the Data port 528 or computer readable program code is alternatively able to be provided to the electronic device 552 through the wireless network 550.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
maintaining, for each respective subject in a plurality of subjects, a set of policies controlling actions by the respective subject on at least one stored data object
wherein the set of policies comprises:
   a policy to limit actions for passive access to stored data objects that have integrity protection for at least one of a label associated with the stored data object or for all of the data within the respective stored data object
receiving a request for a subject to perform an action on a stored data object;
determining that a policy for the subject limits the subject to performing the action on only stored data objects with integrity protection for at least one of labels of the stored data objects, or for all of the data within the stored data objects, wherein the policy controls actions that the subject is able to perform on specified stored data objects;
determining, based on determining that the policy for the subject limits the subject to performing the action on only stored data objects with integrity protection for at least one of labels of the stored data objects, or for all of the data within the stored data objects, that at least one of a label or all of the data within the stored data object has integrity protection;
performing the action based on determining that the at least one of the label or all of the data within the stored data object has integrity protection; and
rejecting the request based on determining that the at least one of the label or all of the data within the stored data object does not have integrity protection.

2. The method of claim 1, further comprising:
wherein the set of policies further comprises at least one of:
   a policy to limit actions to stored data objects that have integrity protection for at least one of a label associated with the stored data object or all of the data within the respective stored data object; or
   a policy to limit actions to stored data objects without integrity protection for at least one of a label associated with the stored data object or all of the data within the stored data object.

3. The method of claim 1, the method further comprising storing metadata comprising a label stored in an extended attribute of the stored data object,
   wherein the policy specifies the stored data object based on the label, and
   wherein the policy limits the action to stored data objects that have labels with integrity protection.

4. The method of claim 1, wherein:
the policy limits the action to stored data objects with integrity protection of all data stored within the stored data object,
the determining, based on determining that the policy for the subject limits the subject to performing the action on only stored data objects with integrity protection, that at least one of a label or all of the data within the stored data object has integrity protection determines whether all of the data within the stored data object has integrity protection,
performing the action is based on determining that all of the data within the stored data object has integrity protection; and
rejecting the request is based on determining that all of the data within the stored data object does not have integrity protection.

5. The method of claim 1, wherein determining the stored data object has integrity protection comprises verifying a validation signature of the stored data object.

6. The method of claim 1, wherein determining the stored data object has integrity protection comprises determining that the stored data object is stored on an integrity protected file system.

7. A device, comprising:
a processor;
a memory coupled to the processor; and
a data storage, coupled to the processor, the data storage comprising at least one file system;
wherein the processor, when operating:
   maintains, for each respective subject in a plurality of subjects, a set of policies controlling actions by the respective subject on at least one stored data object, wherein the set of policies comprises
      a policy to limit actions for passive access to stored data objects that have integrity protection for at least one of a label associated with the stored data object or for all of the data within the respective stored data object;
   receives a request for a subject to perform an action on a stored data object;
   determines that a policy for the subject limits the subject to performing the action on only stored data objects with integrity protection for at least one of labels of the stored data objects, or for all of the data within the stored data objects, wherein the policy controls actions that the subject is able to perform on specified stored data objects;
   determines, based on a determination that the policy for the subject limits the subject to performing the action on only stored data objects with integrity protection for at least one of labels of the stored data objects, or for all of the data within the stored data objects, that at least one of a label or all of the data within the stored data object has integrity protection;
   performs the action based on a determination that the at least one of the label or all of the data within the stored data object has integrity protection; and
   rejects the request based on a determination that the at least one of the label or all of the data within the stored data object does not have integrity protection.

8. The device of claim 7, wherein the processor, when operating, further:
wherein the set of policies further comprises at least one of:
   a policy to limit actions to stored data objects that have integrity protection for at least one of a label associated with the stored data object or all of the data within the respective stored data object; or
   a policy to limit actions to stored data objects without integrity protection for at least one of a label associated with the stored data object or all of the data within the stored data object.

9. The device of claim 7, wherein the processor, when operating, further stores metadata comprising a label stored in an extended attribute of the stored data object,
   wherein the policy specifies the stored data object based on the label, and
   wherein the policy limits the action to stored data objects that have labels with integrity protection.

10. The device of claim 7, wherein:
the policy limits the action to stored data objects with integrity protection of all data stored within the stored data object, and wherein the processor, when operating:
determines, based on determining that the policy for the subject limits the subject to performing the action on only stored data objects with integrity protection, that at least one of a label or all of the data within the stored data object has integrity protection by at least determining whether all of the data within the stored data object has integrity protection,
performs the action based on determining that all of the data within the stored data object has integrity protection; and
rejects the request based on determining that all of the data within the stored data object does not have integrity protection.

11. The device of claim 7, wherein the determination that the stored data object has integrity protection comprises a verification of a validation signature of the stored data object.

12. The device of claim 7, wherein the determination that the stored data object has integrity protection comprises a determination that the stored data object is stored on an integrity protected file system.

13. A non-transitory computer readable storage medium having computer readable program code embodied there-with, the computer readable program code comprising instructions executable by a processor to:
- enforce, for each respective subject in a plurality of subjects, a set of policies controlling actions by the respective subject on at least one stored data object, wherein the set of policies comprises
  - a policy to limit actions for passive access to stored data objects that have integrity protection for at least one of a label associated with the stored data object or for all of the data within the respective stored data object;
- receive a request for a subject to perform an action on a stored data object;
- determine that a policy for the subject limits the subject to performing the action on only stored data objects with integrity protection for at least one labels of the stored data objects or all of the data within the stored data objects, wherein the policy controls actions that the subject is able to perform on specified stored data objects;
- determine, based on a determination that the policy for the subject limits the subject to performing the action on only stored data objects with integrity protection for at least one labels of the stored data objects or all of the data within the stored data objects, that at least one of a label or all of the data within the stored data object has integrity protection;
- perform the action based on a determination that the at least one of the label or all of the data within the stored data object has integrity protection; and
- reject the request based on a determination that the at least one of the label or all of the data within the stored data object does not have integrity protection.

14. The non-transitory computer readable storage medium of claim 13, wherein the set of policies further comprises at least one of:
- a policy to limit actions to stored data objects that have integrity protection for at least one of a label associated with the stored data object or all of the data within the respective stored data object; or
- a policy to limit actions to stored data objects without integrity protection for at least one of a label associated with the stored data object or all of the data within the stored data object.

15. The non-transitory computer readable storage medium of claim 13, wherein the computer readable program code further comprises instructions executable by a processor to store metadata comprising a label stored in an extended attribute of the stored data object,
- wherein the policy specifies the stored data object based on the label, and
- wherein the policy limits the action to stored data objects that have labels with integrity protection.

16. The non-transitory computer readable storage medium of claim 13, wherein the policy limits the action to stored data objects with integrity protection of data within the stored data object, and wherein:
- the instructions to determine, based on determining that the policy for the subject limits the subject to performing the action on only stored data objects with integrity protection, that at least one of a label or all of the data within the stored data object has integrity protection determines whether all of the data within the stored data object has integrity protection,
- the instructions to perform the action perform the action based on determining that all of the data within the stored data object has integrity protection; and
- the instructions to reject the request reject the request based on determining that all of the data within the stored data object does not have integrity protection.

17. The non-transitory computer readable storage medium of claim 13, wherein the determining the stored data object has integrity protection comprises verifying a validation signature of the stored data object.

18. The method of claim 1, wherein the set of policies further comprises a policy to limit actions for passive access to stored data objects without integrity protection for at least one of the label or for all of the data within the stored data object.

19. The device of claim 7, wherein the set of policies further comprises a policy to limit actions for passive access to stored data objects without integrity protection for at least one of the label or for all of the data within the stored data object.

20. The non-transitory computer readable storage medium of claim 13, wherein the set of policies further comprises a policy to limit actions for passive access to stored data objects without integrity protection for at least one of the label or for all of the data within the stored data object.

* * * * *